United States Patent Office 3,639,598
Patented Feb. 1, 1972

3,639,598
ANTI-INFLAMMATORY COMPOSITIONS
AND METHOD
Paul D. Klimstra, Northbrook, Ill., assignor to
G. D. Searle & Co., Chicago, Ill.
No Drawing. Filed Mar. 19, 1969, Ser. No. 808,643
Int. Cl. A61k 27/00
U.S. Cl. 424—238                8 Claims

ABSTRACT OF THE DISCLOSURE

Compositions containing 17β-[N-(aminoalkyl)amino] androstan-3-ols, 5-dehydro and acyl derivatives thereof are useful for the treatment of inflammatory states.

The present invention is concerned with novel compositions and a novel method for the treatment of inflammatory conditions. The novel compositions contain as the active ingredient a compound of the following structural formula

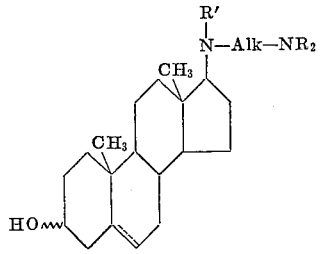

wherein Alk is a lower alkylene radical containing at least two carbon atoms, $NR_2$ is a substituted amino radical selected from the group consisting of di-(lower alkyl)-amino, mono-(lower alkyl)amino, di-[hydroxy(lower alkyl)]-amino, pyrrolidinyl, piperidino and morpholino, R' is hydrogen or a lower alkanoyl radical, the dotted line represents an optional 5,6 double bond and the wavy line indicates the alternative α or β stereochemical configuration.

The potent anti-inflammatory activity of the steroidal compositions of this invention is most surprising in view of the absence of the corticoid side-chain and of the 11-oxygen function, which groups are characteristic of known steroidal anti-inflammatory agents.

The aforementioned compounds and methods for their manufacture are described in U.S. Pat. 3,084,156, issued Apr. 2, 1963.

The lower alkyl radicals encompassed by the $NR_2$ term in the latter structural formula are typified by methyl, ethyl, propyl, butyl, pentyl, hexyl, heptyl and the branched-chain group isomeric therewith.

Representative of the lower alkanoyl groups denoted in that formula are formyl, acetyl, propionyl, butyryl, valeryl, caproyl, heptanoyl and the branched-chain groups isomeric therewith.

The lower alkylene radicals denoted by Alk are typified by ethylene, trimethylene, tetramethylene, pentamethylene and the corresponding branched-chain isomers.

The active ingredient for use in the novel compositions of this invention can be used in the form of the free amine or a pharmaceutically acceptable acid-addition or quaternary salt thereof. Those salts are readily produced by neutralization of the amine with the appropriate acid or by alkylation, suitably with an alkyl halide or sulfate. Specific examples of these salts are the hydrochloride, hydrobromide, sulfate, nitrate, phosphate, lactate, ascorbate, oxalate, succinate, maleate, tartrate, citrate, methochloride, methobromide, methiodide, methosulfate, ethiodide and ethosulfate.

The novel anti-inflammatory compositions of this invention comprise one of the aforementioned active ingredients combined with a pharmaceutically acceptable carrier. These compositions can be administered either orally or parenterally. For oral administration, tablets, lozenges, capsules, dragees, pills or powders are suitable, while aqueous solutions, non-aqueous solutions or suspensions are appropriate for parenteral administration. Acceptable pharmaceutical carriers are exemplified by gelatin capsules, sugars such as lactose or sucrose, starches such as corn starch or potato starch, cellulose derivatives such as sodium carboxymethyl cellulose, ethyl cellulose, methyl cellulose or cellulose acetate phthalate, gelatin, talc, calcium phosphates such as dicalcium phosphate or tricalcium phosphate, sodium sulfate, calcium sulfate, polyvinylpyrrolidone, acacia, polyvinyl alcohol, stearic acid, alkaline earth metal stearates such as magnesium stearate, vegetable oils such as peanut oil, cottonseed oil, sesame oil, olive oil, corn oil or oil of theobroma, water, agar, alginic acid, benzyl alcohol, isotonic saline and phosphate buffer solution as well as other non-toxic compatible substances used in pharmaceutical formulations.

The instant method for producing an anti-inflammatory response in mammals comprises administration of an instant novel composition containing a therapeutically effective amount of the active ingredient. The term "therapeutically effective amount" is defined as the amount of active ingredient that will produce an anti-inflammatory effect. For a particular subject the actual amount of active ingredient to be used will vary with the nature of the subject, the severity of the inflammation, the route of administration and the particular active ingredient used.

The anti-inflammatory effect of the instant compounds is demonstrated by their activity in the polyarthritis assay based on that described by Pearson and Wood, Arthritis Rheumat., 2, 440 (1959). The assay used is described as follows:

Intact male rats of the Sprague-Dawley strain weighing 130–150 g. are adjusted to laboratory conditions for 5–8 days, then are inoculated intradermally, under ether anesthesia, on the proximal end of the tail with killed Mycobacterium butyricum (Difco 0640–33) at a dose of 0.6 mg./0.05 ml. in paraffin oil. 15 days after inoculation the rear ankle joint circumferences are measured and the rats which have responded to the Mycobacterium butyricum, as shown by a combined increase in ankle measurements of at least 54 mm. for the sum of the two circumferences, are grouped randomly and treated daily for three days. The test compound, dissolved or suspended in corn oil or saline, are administered subcutaneously or intragastrically. The control group receives corn oil or saline alone. 24 hours after the last injection the animals are sacrificed and the rear ankle circumferences are again determined. The activity of a compound is assessed on the basis of a decrease in ankle measurements of at least 6 units as compared to the controls. Hydrocortisone is used as a standard.

Table I shows the activity of representative compounds when tested in the latter assay.

TABLE I

| Compound: | Minimum effective dose (mg., oral administration) |
|---|---|
| 17β-[N-(3-piperidinopropyl)-formamido]androst - 5-en-3β-ol | 5 |
| 17β-[N-(3-dimethylaminopropyl)-formamido]-5α-androstan-3β-ol hydrochloride | 5 |
| 17β-[N-(3-pyrrolidinylpropyl) - formamido]androst-5-en-3β-ol | 5 |
| 17β - [N - (3 - piperidinopropyl) - amino] - 5α - an- | |

TABLE I—Continued

| Compound: | Minimum effective dose (mg., oral administration) |
|---|---|
| drostan-3β-ol dihydrochloride | 5 |
| 17β - [N - (3 - diethylaminopropyl) - formamido]androst-5-en-3β-ol | 5 |
| 17β - {N - [3 - (bis - 2 - dihydroxyethylamino)propyl]amino}androst-5-en-3β-ol | 5 |
| 17β - [N - (3 - diethylaminopropyl) - formamido]-5α-androstan-3β-ol | 0.5 |
| 17β - [N - (2 - diisopropylaminoethyl) - amino]androst-5-en-3β-ol | 5 |
| 17β - [N - (2 - diethylaminoethyl)amino]androst-5-en-3β-ol | 5 |
| 17β - [N - (2 - diisopropylaminoethyl) - formamido]androst-5-en-3β-ol | 5 |
| 17β - [N - (2 - diisopropylaminoethyl)amino]-5α-androstan-3β-ol | 5 |
| Hydrocortisone | 1 |

The anti-inflammatory activity of the instant compositions is evidenced further by the testing results in the following assay:

Each of a group of 10 intact male rats weighing 100–130 g. is injected under the plantar surface of each hind foot with 0.1 ml. of a 1% solution of carrageenin (Type 402, Marine Colloids, Inc.). The test compound, dissolved or suspended in saline, corn oil or propylene glycol, is administered subcutaneously or intragastrically one hour prior to the carrageenin injection. The doses normally employed are 25 mg. per rat subcutaneously or 5 mg. per rat intragastrically. Another such group serving as controls is treated in the identical manner save for omission of the test compound. The edema resulting from carrageenin injection is determined by measuring the circumference of the hind feet, in arbitrary units, 5 hours after the carrageenin injection and subtracting the average swelling of the group treated with the test compound from the average swelling of the control group. Compounds are rated active if they produce a significant decrease ($P \leq 0.05$) in the swelling observed in control animals.

The results of that assay on representative instant compounds is shown in Table II.

TABLE II

| Compound: | Minimum effective dose (mg., oral administration) |
|---|---|
| 17β - [N - (2 - diethylaminoethyl)amino]androst-5-en-3β-ol dihydrochloride | 5 |
| 17β - [N - (3 - dimethylaminopropyl)formamido]androst-5-en-3β-ol | 5 |
| 17β - [N - (3 - diethylaminopropyl)formamido]androst-5-en-3β-ol hydrochloride | 2 |
| 17β - [N - (3 - piperidinopropyl)formamido]androst-5-en-3β-ol | 2 |
| 17β - [N - (3 - dimethylaminopropyl)formamido]-5α-androstan-3β-ol hydrochloride | 2 |
| 17β - [N - (3 - pyrrolidinylpropyl)formamido]androst-5-en-3β-ol | 2 |
| 17β - [N - (3 - piperidinopropyl)amino] - 5α - androstan-3β-ol dihydrochloride | 5 |
| 17β - [N - (3 - dimethylaminopropyl)formamido]-5α-androstan-3α-ol | 2 |
| 17β - [N - (3 - methylaminopropyl)formamido]androst-5-en-3β-ol hydrochloride | 5 |
| 17β - [N - (3 - diethylaminopropyl)formamido]androst-5-en-3β-ol | 2 |
| 17β - {N - [3 - bis-(2-dihydroxyethylamino)propyl]amino}androst-5-en-3β-ol | 2 |
| 17β - [N - (3 - pyrrolidinylpropyl)formamido]androst-5-en-3β-ol formate | 2 |
| 17β - [N - (3 - piperidinopropyl)formamido]-5α-androstan-3β-ol | 5 |
| 17β - [N - (3 - diethylaminopropyl)formamido]androst-5-en-3β-ol | 2 |
| 17β - [N - (3 - dimethylaminopropyl)acetamido]androst-5-en-3β-ol | 5 |
| 17β - [N - (2 - diisopropylaminoethyl)amino]androst-5-en-3β-ol | 5 |
| 17β - [N - (2 - diethylaminoethyl)amino]androst-5-en-3β-ol | 2 |
| 17β - [N - (2 - diisopropylaminoethyl)formamido]androst-5-en-3β-ol | 5 |
| 17β - [N - (2 - dipropylaminoethyl)formamido]androst-5-en-3β-ol | 5 |
| 17β - {N - [2-(2,5-dimethylpyrrolidinyl)ethyl]amino}androst-5-en-3β-ol oxalate | 5 |
| 17β - [N - (2 - diethylaminoethyl)formamido]androst-5-en-3β-ol hemihydrate | 5 |
| Hydrocortisone | 2.5 |

It is apparent from the latter data that the instant compositions possess anti-inflammatory activity comparable to that of hydrocortisone, thus should be administered in comparable doses, e.g. 5–200 mg. per day.

The invention will appear more fully from the examples which follow. These examples are given by way of illustration only and are not to be construed as limiting the invention either in spirit or in scope as many modifications both in materials and in methods will be apparent from this disclosure to those skilled in the art. In these examples temperatures are given in degrees centigrade (° C.) and quantities of materials in parts by weight except where otherwise noted.

EXAMPLE 1

A mixture containing 15 parts of 3β-hydroxyandrost-5-en-17-one, 9 parts of 2,5-dimethylpyrrolidine, 1.7 parts of p-toluenesulfonic acid monohydrate and 176 parts of benzene is heated at the reflux temperature for about 16 hours, then is cooled and the solvent is removed by distillation under reduced pressure. The resulting oily residue partially solidifies upon standing and is purified by recrystallization from ethyl acetate, thus affording 17 - {N-[2 - (2,5 - dimethylpyrrolidinyl)ethyl]imino} androst - 5 - en-3β-ol, characterized by an optical rotation, in chloroform, of −37°.

To a solution of 11 parts of 17 - {N-[2-(2,5-dimethylpyrrolidinyl)ethyl]imino}androst - 5 - en-3β-ol in 160 parts of methanol is added carefully 8 parts of sodium borohydride over a period of about 45 minutes. The reaction mixture is stirred for about 30 minutes longer, then is poured carefully into water and the resulting aqueous mixture is extracted with ether. The ether layer is separated, washed with water and evaporated to dryness under reduced pressure, thus affording 17β-{N-[2-(2,5-dimethylpyrrolidinyl)ethyl]amino}androst-5-en-3β-ol.

The latter amine is dissolved in ethyl acetate and is mixed with a solution of 4 parts of oxalic acid in 100 parts of ethyl acetate. The resulting precipitated solid is collected by filtration, washed on the filter with ethyl acetate and dried to afford 17β-{N-[2-(2,5-dimethylpyrrolidinyl)ethyl]amino}androst-5-en-3β-ol oxalate.

EXAMPLE 2

To a solution of 6 parts of 17β-{N-[2-(2,5-dimethylpyrrolidinyl)ethyl]amino}androst - 5 - en - 3β - ol in 640 parts of isopropyl alcohol containing 370 parts of water and 0.2 part of concentrated hydrochloric acid is added 1 part of 5% palladium-on-carbon catalyst and the resulting mixture is shaken with hydrogen at about 3 atmospheres pressures and at about 50° until 1 molecular equivalent of hydrogen is absorbed. The catalyst is removed by filtration and the filtrate is diluted with water, then made alkaline by the addition of ammonia. The precipitated product is collected by filtration, dried in air and recrystallized from aqueous acetone to afford 17β-

{N-[2 - (2,5 - dimethylpyrrolidinyl)ethyl]amino}-5α-androstan - 3β - ol, melting at about 124–125.5°. It displays an optical rotation, in chloroform, of +22°.

EXAMPLE 3

To a solution of 10 parts of 17β-[N-(2-diisopropylamino)ethyl]androst-5-en-3β-ol in 160 parts of ethanol containing 4.8 parts of concentrated hydrochloric acid is added 1 part of platinum oxide catalyst and the resulting reaction mixture is shaken with hydrogen at about 3 atmospheres pressure and at room temperature until 1 molecular equivalent of hydrogen has been absorbed. The catalyst is removed by filtration and the filtrate is partially concentrated by distillation under reduced pressure. The addition of ammonia to the concentrated solution results in precipitation of the crude product. The addition of water completes that precipitation and the resulting solid is collected by filtration, washed on the filter with water and dried in air, thus affording 17β-[N-(2-diisopropylaminoethyl)amino] - 5α - androstan - 3β-ol, characterized by an optical rotation, in chloroform, of +18°.

To an ethereal solution of the latter amine is added an isopropanolic solution of hydrogen chloride and the resulting precipitate is collected by filtration and dried, thus affording the corresponding dihydrochloride.

EXAMPLE 4

To a solution of 25 parts of 17 - [N-(2-dipropylaminoethyl)imino]androst-5-en-3β-ol in 280 parts of methanol is added carefully 15 parts of sodium borohydride over a period of about 45 minutes. The resulting reaction mixture is stirred for 30 minutes longer, then is poured into water. Extraction of the resulting aqueous mixture with ether affords an organic solution, which is washed with water and stripped of solvent under reduced pressure to afford, as an oil, 17β - [N-(2-dipropylaminoethyl)amino]androst-5-en-3β-ol. To a solution of that amine in ethyl acetate is added a solution of 10 parts of oxalic acid in 150 parts of ethyl acetate and the resulting precipitate is collected by filtration, washed with ethyl acetate and dried to afford the corresponding oxalate.

EXAMPLE 5

To a solution of 25 parts of 17 - [N-(2-diethylaminoethyl)imino]androst-5-en-3β-ol in 160 parts of methanol is added carefully 5 parts of sodium borohydride over a period of about 45 minutes. The reaction mixture is stirred for about 30 minutes longer, then is poured carefully into water. Extraction of that aqueous mixture with ether affords an organic solution, which is washed with water, dried over anhydrous sodium sulfate containing decolorizing carbon and stripped of solvent under reduced pressure to afford the crude product as an oil. Recrystallization of that material from acetone results in 17β-[N-(2-diethylaminoethyl)amino]androst-5-en-3β-ol.

EXAMPLE 6

To a solution of 10 parts of lithium aluminum hydride in 100 parts of dioxane is added a solution of 10 parts of 17-[N-(2-diisopropylaminoethyl)imino]androst - 5 - en-3β-ol in 350 parts of hot dioxane. The resulting reaction mixture is heated at the reflux temperature with stirring for about 4 hours, at the end of which time 10 parts of water in 40 parts of dioxane, 7.5 parts of 20% aqueous sodium hydroxide and 34 parts of water are successively added. The resulting inorganic salts are removed by filtration and the filtrate is evaporated to dryness under reduced pressure to afford the crude product as an oil. That oily material partially solidifies upon standing and is purified by recrystallization from acetone, thus affording 17β-[N-(2-diisopropylaminoethyl)amino]androst - 5 - en-3β-ol, characterized by an optical rotation, in chloroform, of −37°.

EXAMPLE 7

To a solution of 4 parts of lithium aluminum hydride in 100 parts of dioxane is added dropwise over a period of about 30 minutes a solution of 10 parts of 17-{N-[3-(bis-2-hydroxyethylamino)propyl]imino}androst - 5 - en-3β-ol in 150 parts of dioxane. The resulting reaction mixture is heated at the reflux temperature for about 6 hours, then is cooled and diluted successively with a solution of 4 parts of water in 20 parts of dioxane, 3 parts by volume of 20% aqueous sodium hydroxide and 14 parts of water. The resulting inorganic salts are removed by filtration and washed on the filter with dioxane. The filtrate is concentrated to dryness under reduced pressure to afford a yellow oily residue. Recrystallization of that material from acetone affords 17β - {N - [3 - (bis-2-hydroxyethylamino)propyl]amino} - androst-5-en-3β-ol, characterized by an optical rotation, in chloroform, of −26°.

EXAMPLE 8

To a solution of 1 part of 17β-[N-(3-piperidinopropyl)amino]androst-5-en-3β-ol in 100 parts by volume of 80% aqueous acetic acid is added 0.1 part of platinum oxide catalyst and the resulting mixture is shaken with hydrogen at atmospheric pressure and room temperature until 1 molecular equivalent of hydrogen has been absorbed. The catalyst is removed by filtration and the filtrate is concentrated to dryness by distillation under reduced pressure. The resulting residue is dissolved in water, then is made alkaline to pH 9 by the addition of dilute aqueous sodium hydroxide. That alkaline mixture is extracted with ether and the ether layer is separated, washed with water, dried over anhydrous potassium carbonate and stripped of solvent by distillation under reduced pressure. The resulting solid residue is purified by recrystallization from acetone, thus affording 17β-[N-(3-piperidinopropyl)amino]-5α-androstan-3β-ol, melting at about 142–144°. It displays an optical rotation, in chloroform, of +23°.

EXAMPLE 9

A mixture consisting of 2 parts of 17β-{N-[2-(2,5-dimethylpyrrolidinyl)ethyl]amino} - 5α-androstan-3β-ol, 20 parts of acetic anhydride and 24 parts of formic acid is heated on the steam bath for about 2 hours. The reaction mixture is then cooled and made alkaline by the addition of dilute aqueous sodium hydroxide, during which time methanol is added in order to keep the mixture homogeneous. Cooling of that mixture at 0–5° results in precipitation of the crude product, which is collected by filtration, washed with water and dried in air to afford 17β - {N - [2 - (2,5-dimethylpyrrolidinyl)ethyl]formamido}-5α-androstan-3β-ol, characterized by an optical rotation, in chloroform, of −11°.

EXAMPLE 10

A mixture consisting of 0.7 part of 17β-[N-(3-piperidinopropyl)amino] - 5α - androstan - 3β - ol, 7 parts of acetic anhydride and 8.4 parts of formic acid is heated on a steam bath for about 2 hours, then is diluted with water and methanol and made alkaline by the addition of concentrated aqueous sodium hydroxide. The mixture is cooled and diluted with water and the resulting precipitate is collected by filtration, dried in air, then recrystallized from acetone-hexane to afford 17β-[N-(3-piperidinopropyl)formamido]-5α-androstan-3β-ol, characterized by an optical rotation, in chloroform, of −4.5°.

EXAMPLE 11

To a solution of 45 parts of 3β-hydroxyandrost-5-en-17-one in 108 parts of formic acid is added, dropwise over a period of about 30 minutes, 90 parts of 3-pyrrolidinylpropylamine. The reaction mixture is heated at 170–180° for about 24 hours, then is diluted with chloroform and extracted with water. The aqueous extract is made alkaline by the addition of aqueous sodium hydroxide, then is extracted with chloroform. The chloroform layer is separated, washed with water, dried over anhydrous sodium sulfate and stripped of solvent under reduced pressure to afford the crude product as an oil, which solidifies upon standing. Recrystallization of that material first from acetone then from ethyl acetate results in 17β-[N-(3-piperidinopropyl)formamido]androst - 5 - en-3β-ol, melting at about 133.5–135°.

EXAMPLE 12

To a solution of 2 parts of 17β-[N-(3-piperidinopropyl) formamido]androst-5-en-3β-ol in 24 parts of ethyl alcohol containing 40 parts of acetone and 17.5 parts of ether is added a solution of 0.4 part of oxalic acid in 8 parts of ethanol. The resulting precipitate is collected by filtration and washed on the filter with acetone, then purified by recrystallization from methanol-ethyl acetate, thus affording 17β - [N - (3-piperidinopropyl)formamido]androst-5-en-3β-ol oxalate.

EXAMPLE 13

A mixture containing 2 parts of 17β-[N-(2-diethylaminoethyl)amino]androst-5-en-3β-ol, 20 parts of acetic anhydride and 24 parts of formic acid is heated on a steam bath for about 2 hours, then is cooled and made alkaline by the addition of aqueous sodium hydroxide, during which time methanol is added in order to keep the mixture homogeneous. That alkaline mixture is cooled at 0–5° until crystallization is complete and the resulting platelet-like crystals are collected by filtration to afford 17β - [N - (2 - diethylaminoethyl)formamido] androst-5-en-3β-ol, characterized by an optical rotation, in dioxane, of —35°.

EXAMPLE 14

A mixture containing 4 parts of 17β-[N-(3-dimethylaminopropyl)amino]androst - 5 - en-3β-ol, 21.6 parts of acetic anhydride and 40 parts of pyridine is stored at room temperature for about 18 hours, then is poured into 350 parts of water containing 20 parts of sodium acetate. This aqueous mixture is made alkaline by the addition of concentrated aqueous sodium carbonate and the resulting precipitate is collected by filtration to afford 17β - [N - (3 - dimethylaminopropyl)acetamido]androst 5-en-3β-ol, characterized by a melting point of 201.5–203° and by an optical rotation, in chloroform, of —93.5°.

EXAMPLE 15

A mixture consisting of 4 parts of 17β-[N-(2-diisopropylaminoethyl)amino]androst-5-en-3β-ol, 40 parts of acetic anhydride and 48 parts of formic acid is heated on a steam bath for about 2 hours, cooled, diluted with methanol and made alkaline by the addition of aqueous sodium hydroxide. The resulting alkaline mixture is cooled at 0–5° and the resulting crystals are collected by filtration, washed on the filter with water and dried in air to afford 17β-[N-(2-diisopropylaminoethyl)formamido]androst-5-en-3β-ol, which compound displays an optical rotation, in chloroform, of —22°.

EXAMPLE 16

A mixture consisting of 4 parts of 17β-[N-(2-dipropylaminoethyl)amino]androst-5-en-3β-ol, 30 parts of acetic anhydride and 36 parts of formic acid is allowed to react according to the procedure of Example 15 and the product is isolated in the manner described in that example, thus affording platelet-like crystals of 17β-[N-(2-dipropylaminoethyl)formamido]androst-5-en-3β - ol, which compound displays an optical rotation of —70°.

EXAMPLE 17

When an equivalent quantity of 17β-[N-(2-diethylaminoethyl)formamido]androst-5-en-3β-ol is substituted in the procedure of Example 12, there is obtained 17β-[N-(2 - diethylaminoethyl)formamido]androst-5-en-3β-ol oxalate.

EXAMPLE 18

A representative composition for oral administration is shown below:

| | G. |
|---|---|
| 17β - [N - (3 - diethylaminopropyl)formamido]androst-5-en-3β-ol | 59.5 |
| Sodium sulfate | 2,214 |
| Corn starch | 791 |
| Acacia | 105 |
| Sucrose | 264 |

From that mixture there is obtained 11,900 tablets containing 5 mg. of the active ingredient.

EXAMPLE 19

A composition containing 100 mg. of the active ingredient is described below:

17β - [N - (2-diisopropylaminoethyl)amino]androst-5-en-3β-ol—100 mg.
Terra aba Eng. (calcium sulfate dihydrate mined)—119 g.
Corn starch—87 mg.
Sucrose—36.3 mg.
Carbosil 5 M (fumed silicon dioxide)—12 mg.
Flogel 60 (thin boiling refined corn starch)—1.4 mg.
Magnesium stearate—8.5 mg.
Talc—72.2 mg.

EXAMPLE 20

For administration by injection the following representative suspension containing 50 mg. of active ingredient per ml. is suitable:

17β - [N-(2-dimethylaminoethyl)amino]androst-5-en-3β-ol—2.5 mg.
Sorbitol U.S.P.—25.025 g.
Water for injection—32.975 ml.
Tween 80 (polyoxyethylenesorbitan monoleate)—2.5 g.
Methylparaben (p-hydroxybenzoic acid methyl ester)—0.9 g.
Propyl paraben (p-hydroxybenzoic acid propyl ester)—0.1 g.

EXAMPLE 21

For the topical treatment of inflammatory states the following 1% composition is suitable:

| | G. |
|---|---|
| 17β - [N - (2-diisopropylaminoethyl)amino]-5α-androstan-3β-ol | 10 |
| Methylparaben (p - hydrobenzoic acid methyl ester) | 0.25 |
| Propylparaben (p - hydroxybenzoic acid propyl ester) | 0.15 |
| Sodium lauryl sulfate | 10 |
| Propylene glycol | 120 |
| Stearyl alcohol | 250 |
| White petrolatum | 370 |

What is claimed is:
1. The method which comprises administering to a mammal afflicted with an inflammatory condition a therapeutically effective quantity in the amount of about 5 mg. to 100 mg. of a compound of the formula

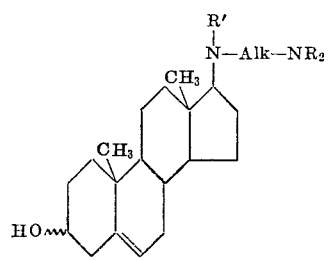

wherein Alk is a lower alkylene radical containing at least 2 carbon atoms, $NR_2$ is a substituted amino radical selected from the group consisting of di-(lower alkyl)amino, mono-(lower alkyl)amino, di-[hydroxy(lower alkyl)]

amino, pyrrolidinyl, 2,5-dimethylpyrrolidinyl, piperidino and morpholino, R' is hydrogen or a lower alkanoyl radical and the dotted line represents an optional 5,6 double bond, and a pharmaceutical carrier.

2. As in claim 1, the method which comprises administering to a mammal afflicted with an inflammatory condition a therapeutically effective quantity in the amount of about 5 mg. to 100 mg. of 17β-[N-(3-piperidinopropyl)formamido]-5α-androstan-3β-ol.

3. As in claim 1, the method which comprises administering to a mammal afflicted with an inflammatory condition a therapeutically effective quantity in the amount of about 5 mg. to 100 mg. of 17β-[N-(2-diisopropylaminoethyl)formamido]androst-5-en-3β-ol.

4. As in claim 1, the method which comprises administering to a mammal afflicted with an inflammatory condition a therapeutically effective quantity in the amount of about 5 mg. to 100 mg. of 17β-[N-(3-diethylaminopropyl)formamido]androst-5en-3β-ol.

5. As in claim 1, the method which comprises administering to a mammal afflicted with an inflammatory condition a therapeutically effective quantity in the amount of about 5 mg. to 100 mg. of 17β-[N-(2-diisopropylaminoethyl)amido]androst-5-en-3β-ol.

6. As in claim 1, the method which comprises administering to a mammal afflicted with an inflammatory condition a therapeutically effective quantity in the amount of about 5 mg. to 100 mg. of 17β-[N-(3-diethylaminopropyl)formamido]androst-5-en-3β-ol.

7. As is claim 1, the method which comprises administering to a mammal afflicted with an inflammatory condition a therapeutically effective quantity in the amount of about 5 mg. to 100 mg. of 17β-[N-(2-diethylaminopropyl)formamido]androst-5-en-3β-ol.

8. As in claim 1, the method which comprises administering to a mammal afflicted with an inflammatory condition a therapeutically effective quantity in the amount of about 5 mg. to 100 mg. of 17β-[N-(2-diisopropylaminoethyl)formamido]androst-5-en-3β-ol.

References Cited
UNITED STATES PATENTS 3,084,156   4/1963   Counsell et al. ------ 260—239.5

RICHARD L. HUFF, Primary Examiner

PO-1050
(5/69)

UNITED STATES PATENT OFFICE
CERTIFICATE OF CORRECTION

Patent No. 3,639,598                Dated February 1, 1972

Inventor(s) Paul D. Klimstra

It is certified that error appears in the above-identified patent and that said Letters Patent are hereby corrected as shown below:

Column 4, line 70, "pressures" should be -- pressure --.

Column 10, line 2, "amido" should be -- amino --.

Column 10, line 12, "formamido]androst-5-en-3β-ol" should be -- formamido]-5α-androstan-3β-ol --.

Signed and sealed this 4th day of July 1972.

(SEAL)
Attest:

EDWARD M.FLETCHER,JR.
Attesting Officer

ROBERT GOTTSCHALK
Commissioner of Patents